(12) United States Patent
Bujak

(10) Patent No.: US 6,518,751 B1
(45) Date of Patent: Feb. 11, 2003

(54) MAGNETORESISTIVE ROLLOVER SENSOR

(75) Inventor: Christopher Richard Bujak, Clinton Township, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,705

(22) Filed: Feb. 5, 2002

(51) Int. Cl.[7] .............................. G01B 7/30; G01C 9/06; G01C 9/12; G01P 15/105; H01H 35/02
(52) U.S. Cl. .................. 324/207.21; 324/207.22; 324/207.25; 33/366.24; 73/514.31; 73/514.37; 200/61.46; 340/440
(58) Field of Search .................. 324/251, 252, 324/207.2, 207.21, 207.22, 207.25; 200/61.45 R, 61.46, 61.52; 73/514.01, 514.02, 514.08, 514.21, 514.22, 514.31, 514.36, 514.37; 33/364, 365, 366.11, 366.24, 378, 391; 340/440, 689

(56) References Cited

U.S. PATENT DOCUMENTS

| | | | |
|---|---|---|---|
| 3,835,273 A | | 9/1974 | Stolarik |
| 4,016,535 A | * | 4/1977 | Dinlocker ............ 200/61.52 X |
| 4,784,237 A | | 11/1988 | Condne et al. |
| 4,798,087 A | | 1/1989 | Takeda et al. |
| 4,914,387 A | * | 4/1990 | Santos .................... 324/252 X |
| 4,922,620 A | | 5/1990 | Terragni |
| 4,923,015 A | * | 5/1990 | Barsby et al. ........ 33/366.24 X |
| 4,994,741 A | * | 2/1991 | Takahashi et al. .. 324/207.21 X |
| 5,261,279 A | | 11/1993 | Wolf et al. |
| 5,574,442 A | | 11/1996 | Kinoshita et al. |
| 5,955,714 A | | 9/1999 | Reneau |
| 6,018,130 A | | 1/2000 | Haack et al. |
| 6,175,233 B1 | * | 1/2001 | McCurley et al. ....... 324/207.2 |
| 6,184,764 B1 | * | 2/2001 | Edwards et al. ...... 200/61.45 R |
| 6,202,488 B1 | | 3/2001 | Cash |

FOREIGN PATENT DOCUMENTS

FR     2 640 042     6/1999

* cited by examiner

Primary Examiner—Gerard R. Strecker
(74) Attorney, Agent, or Firm—Gregory P. Brown

(57) ABSTRACT

A vehicle rollover sensor 10 is provided, including a movable member free 12 free to rotate about a single axis 14. The movable member 12 includes an inertial mass 18. A magnet 22 is mounted to the movable member 12. The vehicle rollover sensor 10 further includes a magnetoresistive sensor 24 capable of sensing changes in the magnetic field due to changes in the orientation of the moveable member 12.

23 Claims, 1 Drawing Sheet

MAGNETORESISTIVE ROLLOVER SENSOR

BACKGROUND OF INVENTION

The present invention relates generally to a vehicle rollover sensor and more particularly to a magnetoresistive rollover sensor.

Automotive vehicle design is often guided by a variety of factors and concerns. Significant among those concerns has been the safety of the driver and passengers. Numerous safety related components and features have been developed for use in modern vehicles for the purpose of improving the vehicle performance and safety.

These components and features often work in concert with the vehicle to provide a defense against passenger injury. Their form, design, and individual application must often relate to the vehicle performance and handling characteristics in order to function optimally. Thus an intimate knowledge of vehicle handling and performance characteristics may be fundamental to not only specific safety feature performance, but to the overall safety characteristics of the vehicle as a whole.

Such has been the case involving vehicle roll-over. The popularity of vehicles with higher centers of gravity has lead to an increased interest in the prediction of vehicle roll-over as well as to the design of safety features designed to reduce the risk of injury due to roll-over. Both of these design concerns are served by the use of rollover sensors. Roll-over sensors, positioned within the vehicle, can be utilized by design engineers during testing to evaluate the roll-over characteristics of vehicle designs during a wide variety of testing procedures. Precise knowledge of roll-over angles can assist design engineers in evaluating the safety of a vehicle, as well as assist them in the design modifications to improve such safety characteristics. These same sensors can additionally be utilized during vehicle operation in concert with safety features to both reduce the risk of roll-over, as well as protect passengers should such a roll-over occur. Again, the efficacy of such safety features can be optimized with an improved knowledge of a vehicles absolute roll angle.

Present roll-over sensors, however, often utilize systems that fail to provide the accurate roll angle information desired by both designers and safety systems. Often such systems only indicate when a predetermined angle has been exceeded while failing to provide the actual vehicle roll angle. Other systems, while attempting to provide an actual vehicle roll angle do so with a degree of accuracy that could be improved upon. Vehicle motion and momentum during testing and operation can adversely effect some known systems and thereby further decrease their accuracy. It would therefore be highly desirable to have an improved roll-over sensor for use in a vehicle that would provide a vehicle's absolute roll angle with improve accuracy such that vehicle design as well as the design of safety systems could be better served.

SUMMARY OF INVENTION

It is, therefore, an object of the present invention to provide an improved vehicle rollover sensor. It is a further object of the present invention to provide a an improved vehicle rollover sensor utilizing a magnetoresistive sensor.

In accordance with the objects of the present invention, a vehicle rollover sensor is provided. The vehicle rollover sensor includes a movable member free to rotate about a single axis. The movable member includes an inertial mass. A magnet is mounted to the movable member. The vehicle rollover sensor further includes a magnetoresistive sensor capable of sensing changes in the magnetic field due to changes in the orientation of the moveable member.

Other objects and features of the present invention will become apparent when viewed in light of the detailed description of the preferred embodiment when taken in conjunction with the attached drawings and appended claims.

DETAILED DESCRIPTION

Figure 1:
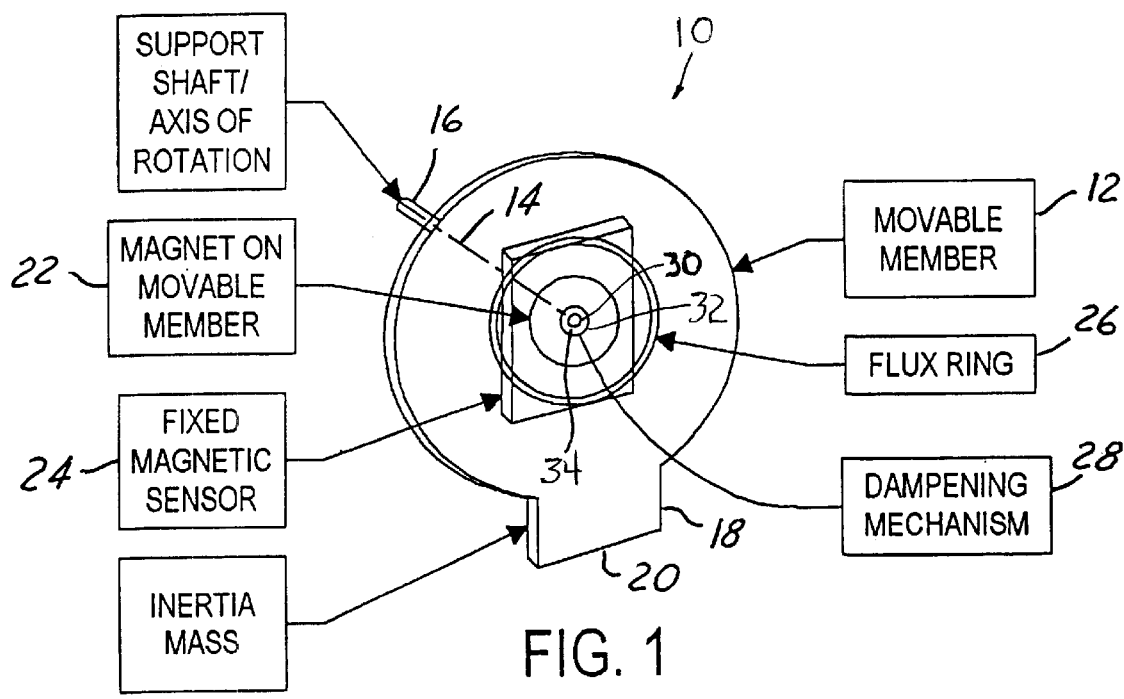
FIG. 1 is an illustration of an embodiment of a vehicle rollover sensor in accordance with the present invention.

Referring now to FIG. 1, which is an illustration of a vehicle rollover sensor 10 in accordance with the present invention. It is intended that the present invention be utilized within a vehicle for the purposes of testing to determine the roll angle of the vehicle. It is further contemplated that the present invention may be utilized within a vehicle as a part of a vehicle safety system. Although no specific vehicle safety system or testing diagnostic system is described by the present invention, a wide variety of such systems would be known to those skilled in the art or may be devised to utilized the present invention.

The vehicle rollover sensor 10 includes a movable member 12. The movable member 12 is free to rotate about a single axis 14. Although a variety of methods may be utilized to allow the movable member 12 to rotate about a single axis 14, one embodiment contemplates the use of a shaft member 16. In other words, the movable member 12 is free to rotate about the shaft member 16 which in turn is preferably fixed to the vehicle in an appropriate location. As would be obvious for a roll-over application, the shaft member 16 is preferably mounted horizontally in a fore-aft position. In addition to providing an axis of rotation, the shaft member 16 may also be utilized as a method of providing support to the vehicle rollover sensor 10. The movable member 12 includes an inertial mass 18. The inertial mass 18 is a non-symmetrical mass that provides the movable member 12 with an independent orientation relative to the vehicle angle. Thus, as the vehicle rolls, the movable member 12 will retain its orientation relative to the ground but will have rotated relative to the shaft member 16 fixed to the vehicle. In this fashion, the present invention utilizes the movable member 12 to determine the vehicle angle. Although the inertial mass 18 is illustrated as a protruding member 20 formed as a portion of the movable member 12, it should be understood that a wide variety of inertial mass 18 embodiments would be obvious to one skilled in the art and are contemplated by the present invention. The inertial mass 18 need only represent any orientating mass affixed to or formed as part of the movable member 12. Similarly, although the movable member 12 has been illustrated in a cylindrical embodiment, it should be understood that the movable member 12 may be formed in a variety of shapes and sizes.

The vehicle rollover sensor 10 further includes at least one magnet 22 positioned on the movable member 12 and thereby free to rotate about the shaft member 16 in conjunction with the movable member 12. The at least one magnet 22 may be mounted onto the movable member using a variety of known methods. Alternatively, the magnet 22 may be formed integrally with the movable member 12. In one embodiment the magnet 22 is cylindrical in shape, although a variety of shapes are contemplated. In addition, although the magnet 22 may be positioned in a variety of positions on the movable member 12, in one embodiment, the magnet 22 is centered on the rotational axis 14 of the movable member 12. The vehicle rollover sensor 10 also includes a magnetoresistive sensor 24. Magnetoresistive sensors 24 are well known in the prior art. These sensors measure changes in the magnetic field created by the magnet 22. The magnetoresistive sensor 24 remains fixed to the shaft member 16, thereby registering any change in orientation of the movable member 12 and its attached magnet 22. In this fashion, when the fixed magnetoresistive sensor 24 rotates with the vehicle, the movable member 12 changes orientation with respect to the sensor 24 and the vehicle angle can be determined. Magneto resistive sensors 24 are known and can measure minute changes in the orientation of a nearby magnetic field such as that created by the magnet 22. Simple known processing methods can be used to calibrate the magnetoresistive sensor 24 readings with degree of vehicle roll. The magnet 22 may be polarized in any fashion such that its magnetic field changes orientation relative to the magnetoresistive sensor 24 as the movable member 12 rotates relative to the shaft member 16. It should be understood, that although the present invention has been described in terms of a magnet 22 mounted to the movable member 12 and a fixed magnetoresistive sensor 24, alternate embodiments may fix the magnet 22 and mount the magnetoresistive sensor 24 to the movable member 12.

The present invention can further include a flux ring 26. The flux ring 26 is utilized to prevent any external magnetic fields from interfering with the magnetoresistive sensor 24. In addition, the flux ring 26 can be utilized to concentrate the magnetic field of the reference magnet 22.The flux ring 26 is preferably positioned to surround the magnet 22. In addition, it is preferable to have the flux ring 26 centered around the sensitive portion of the magnetoresistive sensor 24. The vehicle rollover sensor 10 can further include a dampening mechanism 28. The dampening mechanism 28 can be utilized to limit the movement of the movable member 12 along the rotational axis 14. The damping mechanism 28, as illustrated, acts to dampen the movable member's 12 rotation about the shaft member 16. Although the workings of damping mechanisms 28 are well known, the illustrated damping mechanism has an inner circumference 30 affixed to the shaft member 16, an outer circumference 32 fixed to the movable member 12, and a fluid core 34 positioned in-between. The fluid 34 thereby allows relative rotation of the members 12,16 but dampens such rotation. In addition, the dampening mechanism 28 may be utilized to control the sensitivity of the vehicle rollover sensor 10 to vibration and non-rotational inertial forces. Although a wide variety of dampening mechanisms 28 are known in the art and contemplated by the present invention, one embodiment contemplates the use of fluid. Another embodiment contemplates the use of a counter spring.

While particular embodiments of the invention have been shown and described, numerous variations and alternative embodiments will occur to those skilled in the arm. Accordingly, it is intended that the invention be limited only in terms of the appended claims.

What is claimed is:
1. A vehicle rollover sensor comprising;
   a movable member rotatable about a single axis, said movable member comprising a non-symmetrical inertial mass such that said movable member remains orientated downward as said single axis is rotated;
   a single magnet mounted to said movable member, said single magnet having a magnetic field; and
   a magnetoresistive sensor axially adjacent to said single magnet and fixed to said single axis, said magnetoresistive sensor capable of measuring the orientation of said magnetic field relative to said magnetoresistive sensor.
2. A vehicle rollover sensor as described in claim 1 further comprising:
   a support shaft positioned on said single axis, said support shaft in communication with said movable member.
3. A vehicle rollover sensor as described in claim 1, wherein said non-symmetrical inertial mass comprises a protruding member formed integrally with said movable member.
4. A vehicle rollover sensor as described in claim 1 wherein said movable member comprises a cylindrical form.
5. A vehicle rollover sensor as described in claim 1 wherein said single magnet comprises a cylindrically shaped magnet centered on said single axis.
6. A vehicle rollover sensor as described in claim 1, further comprising:
   a flux ring affixed to said movable member, said flux ring reducing the effect of external magnetic fields on said fixed magnetoresistive sensor and concentrating the magnetic field of said single magnet.
7. A vehicle rollover sensor as described in claim 6, wherein said flux ring is mounted on said movable member and surrounds said single magnet.
8. A vehicle rollover sensor as described in claim 1, further comprising:
   at least one dampening mechanism in communication with said movable member.
9. A vehicle rollover sensor as described in claim 8 wherein said at least one dampening mechanism comprises a fluid.
10. A vehicle rollover sensor as described in claim 8 wherein said at least one dampening mechanism comprises a spring.
11. A vehicle rollover sensor comprising;
   a movable member rotatable about a single axis, said movable member comprising a non-symmetrical inertial mass such that said movable member remains oriented downward as said single axis is rotated;
   a magnetoresistive sensor mounted to said movable member, said magnetoresistive sensor capable of measuring the orientation of said magnetic field relative to said magnetoresistive sensor; and
   a single magnet having a magnetic field, said single magnet axially adjacent to said magnetoresistive sensor and fixed to said single axis.
12. A vehicle rollover sensor as described in claim 11 further comprising:
   a support shaft positioned on said single axis, said support shaft in communication with said movable member.
13. A vehicle rollover sensor as described in claim 11, wherein said non-symmetrical inertial mass comprises a protruding member formed integrally with said movable member.
14. A vehicle rollover sensor as described in claim 11 wherein said movable member comprises a cylindrical form.
15. A vehicle rollover sensor as described in claim 11 wherein said single magnet comprises a cylindrical shaped magnet centered on said single axis.
16. A single rollover sensor as described in claim 11, further comprising:

a flux ring affixed to said movable member, said flux ring reducing the effect of external magnetic fields on said fixed magnetoresistive sensor and concentrating the magnetic field of said single magnet.

17. A vehicle rollover sensor as described in claim 16, wherein said flux ring surrounds said single magnet.

18. A vehicle sensor as described in claim 11, further comprising:

at least one dampering mechanism in communication with said movable member.

19. A vehicle sensor described in claim 18 wherein said at least one dampening mechanism comprises a fluid.

20. A vehicle rollover sensor as described in claim 18 wherein said at least one dampening mechanism comprises a spring.

21. A method of sensing the roll angle of a vehicle comprising:

affixing a magnetoresistive sensor to the vehicle such that said magnetoresistive sensor rotates with the vehicle;

placing a single magnet axially adjacent to said magnetoresistive sensor, said single magnet retaining its static orientation as said magnetoresistive sensor rotates;

using said magnetoresistive sensor to measure changes in the orientation of the magnetic field produced by said single magnet relative to the magnetoresistive sensor as said magnetoresistive sensor rotates with the vehicle and said single magnet retains its static orientation;

determining the roll angle of the vehicle based upon said changes in the orientation of the magnetic field measured by said magnetoresistive sensor.

22. A method as described in claim 21, wherein said single magnet retains its static orientation by being mounted on a movable member comprising a non-symmetrical inertial mass, said movable member free to rotate about a single axis.

23. A method as described in claim 21, further comprising:

reducing the effect of outside magnetic fields using a flux ring affixed to said movable member, said flux ring centered on said single axis and surrounding said single magnet.

* * * * *